Figure 1:
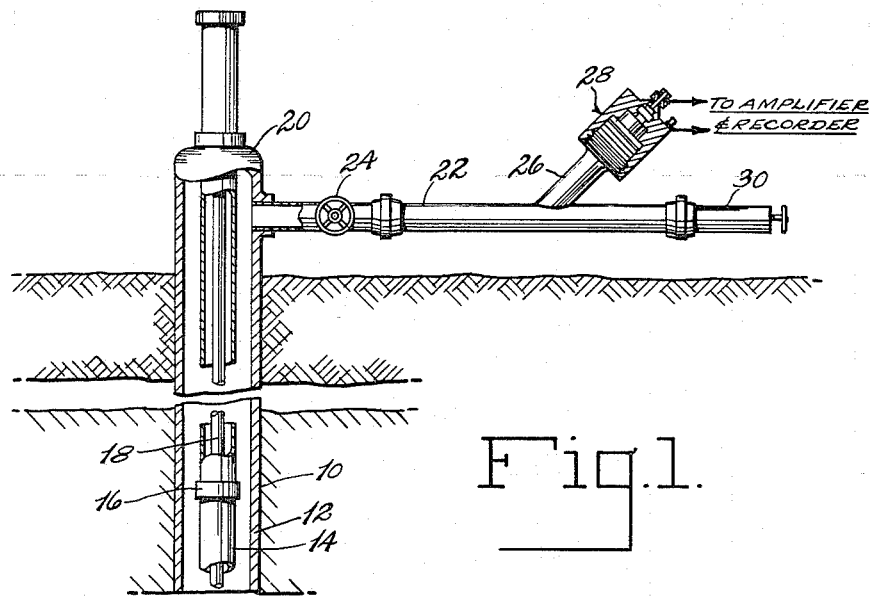

United States Patent Office 2,914,686
Patented Nov. 24, 1959

2,914,686
CRYSTAL MICROPHONE

Roy J. Clements and Robert J. Loofbourrow, Bellaire, and Burton D. Lee, Houston, Tex., assignors to Texaco Inc., a corporation of Delaware Application October 6, 1953, Serial No. 384,484

5 Claims. (Cl. 310—9.1)

This invention relates to microphones, and more particularly to a crystal-type microphone for use in well sounding apparatus, i.e., apparatus for measuring the depth of the liquid level in an oil or water well. The principal object of the invention is the provision of a simple and rugged device of this kind which has many advantages over the conventional dynamic type of microphone now being used. These advantages will be pointed out hereinafter.

As is well known, it is desirable to know as accurately as possible the depth of the liquid level in a well, since this information is useful in determining the potential of the well, the size and type of pumping apparatus which will be necessary, the location or depth at which the pump should be placed in the well, the proper operation of the pump, etc. In a conventional method of well sounding, the well is closed in at the surface and a pressure wave is produced in the upper end of the well, this wave traveling downward through the well, a portion of the wave being reflected back from tubing collars, casing joints and other constrictions or enlargements of the gas column above the liquid in the well. A large portion of the pressure wave is also reflected from the surface of the liquid in the well, and the reflected waves pass upwardly to the surface where they actuate a wave-responsive device or microphone. The pressure wave pulses are detected by the microphone and usually amplified and recorded. Since the velocity of the wave may vary due to variations in the density and composition of the gas in the well, it is more or less customary to ascertain the depth of the liquid level by counting the number of tubing joint reflections and then multiplying by the average length of the tubing sections.

Most of the microphones which have been used for detecting the wave pulses reflected back to the surface through the well have been of the dynamic or moving coil type, each microphone having a diaphragm to which a pick-up coil is attached, the coil being disposed in the air gap of a magnetic circuit. One of these microphones is disclosed in the U.S. Letters Patent No. 2,403,535, granted July 9, 1946, to J. T. Kremer. In accordance with that patent, the static well pressure is equalized on both sides of the diaphragm, and corrosive gases are prevented from damaging the device by using a pressure-equalizing bulb disposed in back of the microphone and the interior of which is connected to the space in back of the diaphragm while the exterior is subject to pressure of the gas in front of the diaphragm. Other microphones which have been used are constructed in the manner of conventional permanent magnet loud speakers, but it is obviously difficult to equalize the static pressure on both sides of the cone of such a device and to prevent corrosive gases from reaching the voice or pickup coil and the air gap. Both of the microphones described above are of the dynamic or moving coil type in which the voltages generated are proportional to the velocity of the pickup coil, although it is realized, of course, that the reflected sound pulses produced by the explosion or other sound source are pressure waves. The pressure wave may be produced by the firing of a blank cartridge in the closed space at the upper end of the well or in other manners such as by the sudden introduction into the upper end of the well of a small charge of steam or gas under high pressure.

In accordance with the invention, in order to obviate the difficulties inherent in the use of a microphone of the dynamic type, a pressure wave responsive device is provided comprising a small housing having a chamber adapted to be connected with the interior of the well and a pressure-sensitive component in the form of a piezo-electric crystal disposed within the chamber in such a way that the pressure pulses reaching the chamber cause compression of the crystal to produce corresponding voltages which are then amplified and recorded as heretofore described. As will be described hereinafter, it has been found that the provision of a thin metal diaphragm in contact with and covering the side of the crystal which would otherwise be exposed to the gas in the well not only serves to protect the crystal but also greatly increases the sensitivity of the microphone.

As is known, there are at least two general types of materials which can translate electrical variations into mechanical movements and vice versa: (1) earlier-known types usually obtained or grown as crystals and often designated piezo-electric; and (2) types which are synthetically produced and polarized and often designated ferro-electric. Whether or not the term piezo-electric, as used by others, is intended to refer exclusively to the former types of material, it is being used herein, e.g., in the claims which follow, as a generic term descriptive of all types of materials having the functional capabilities of translating electrical variations to mechanical movements and vice versa.

It will be seen that with the crystal microphone it is not necessary to equalize the static pressure at any place in the device, and a pressure-equalizing bulb such as is disclosed in the aforementioned Kremer patent is therefore unnecessary. The output of the crystal microphone is proportional to the pressure of the reflected waves rather than to the velocity of a diaphragm and coil, as in the case of the moving coil device. The crystal-type microphone has no moving parts whatever, and consequently it can be made much more rugged than a microphone having a moving coil. The frequency response of the crystal is much better than the moving coil type, particularly at the low frequencies used in well sounding. Again, the crystal microphone is a high impedance device and thus requires no impedance transformer as does the moving coil device. Since the crystal microphone has no moving parts, the crystal mounting is less sensitive to shock and vibration, and with the proper shock mounting to prevent the pickup of mechanical well noise, the amplifier sensitivity can be increased to a level which will permit a smaller explosive charge to be used. Consequently, the use of a smaller cartridge as the sound source will permit a lighter, more compact firing assembly and thus there will be less of the corrosive powder fumes. As still another advantage of the crystal microphone, the working pressure of such a device is limited only to the strength of the housing, whereas the conventional type moving coil microphone is usually limited to a working pressure of about 1500 lbs./sq. in.

Figure 2:
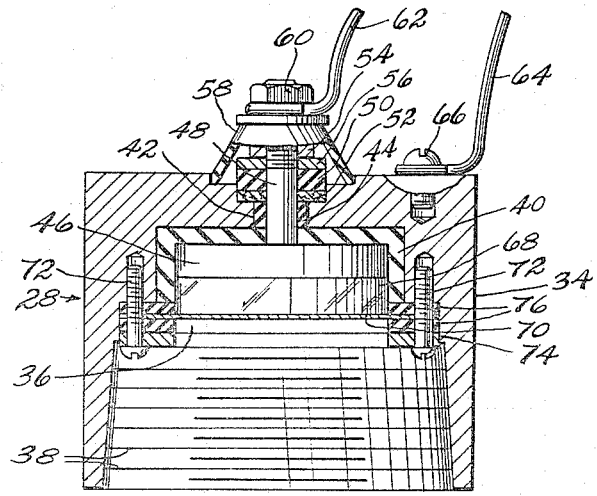

For a better understanding of the invention, reference may be had to the accompanying drawing in which Fig. 1 is a vertical sectional view through a portion of a well to which is attached a crystal-type microphone embodying the invention; and Fig. 2 is a cross-sectional view showing in greater detail the construction of the microphone.

Referring to the drawing, a bore hole or well 10 is shown as provided with a casing 12 and a string of tubing 14 extending downwardly therethrough. A tubing collar 16 is shown at the connection between two of the adjacent sections of tubing and a string of pump rods 18 is shown as extending downwardly through the tubing string 14 although this forms no essential part of the present invention. Attached to the casing below the casing head 20 is a pipe 22 containing a valve 24, the pipe having a Y connection or extension 26 to the outer end of which the microphone 28 is attached. Secured to the outer end of the pipe 22 is a firing device 30 of any suitable type which may be operated to produce a sharp explosive pulse and thus a pressure wave within the pipe 22 and casing 10, by the firing of a blank cartridge or the like. When the cartridge is fired, the pressure wave produced thereby passes through the pipe 22, the valve 24 being maintained open, and into the interior of the casing 10 through which it travels downwardly, portions being reflected upwardly by the tubing collars 16 until the main wave reaches the liquid level, not shown, from which the main portion of the wave is also reflected upwardly. The upwardly reflected waves pass out of the casing through the pipes 22 and 26 to the interior of the microphone 28 wherein voltage pulses are produced and conducted to a suitable amplifier and recorded, not shown. As stated hereinbefore, by counting the number of pulses in the record produced by the waves reflected from the tubing collars 16 between the firing of the charge and the receipt of reflection from the top of the liquid and multiplying this number by the average length of the sections of tubing, an accurate determination can be made as to the depth of the liquid level within the well.

In Fig. 2 an enlarged view of the microphone 28 is shown, this device comprising a cup-shaped metal housing 34 provided with a chamber 36 and internal screw threads 38 adapted to be connected to similar threads on the end of the pipe extension 26. That portion of the chamber 36 in the inner end of the housing 34 is preferably lined with a layer 40 of a hard electrical insulating material such as the phenolic condensation product "Bakelite." A hole 42 is provided in the center of the outer end of the housing 34 and is also lined with electrical insulating material 44. Within the chamber 36 and in contact with the insulating liner 40 is a metal disc 46 of brass or the like having an axial rod-like extension 48 passing through the insulating liner 44. Around the extension 48 is an insulating washer 50 within an enlargement of the hole 42, and a sealing gasket 52 is disposed between the washer 50 and the insulating liner 44. Threaded upon the extension 48 is a nut 54, and a terminal washer 56 is shown as disposed between the nut and the insulating washer 50. A cone-shaped insulating member 58 surrounds the outer portion of the extension 48, covering the elements 54 and 56 and is held in place against the outer surface of the housing 34 by the nut 60 threaded upon the extension 48. Connecting leads 62 and 64 are shown as attached to the extension 48 and the housing 34, respectively, by means of the nut 60 and a screw 66.

Disposed adjacent and in contact with the brass disc 46 is a piezo-electric crystal 68 shown as in the form of a disc of substantially the same size as the brass disc 46. The crystal is held in place by a thin metal diaphragm 70 in contact with and covering the outer surface of the crystal. The diaphragm 70 is secured to the housing 34 by machine screws 72 passing through an annular compression ring 74 and the annular gasket rings 76 disposed at opposite sides of the periphery of the diaphragm. The electrical connection between the lead 64 and the outer surface of the crystal 68 is made through the housing 34, screws 72 and the diaphragm 70, while the inner surface of the crystal 68 is connected electrically to the lead 62 through the brass disc 46 and rod 48.

The crystal 68 is preferably formed of a synthetic piezoelectric material such as barium titanate which is a ceramic material formed by fusing barium oxide and titanium oxide, as it has been found that this material produces extremely satisfactory results and is responsible for most of the advantages, which have been previously pointed out, of this detector over the dynamic or moving coil microphone.

It is believed that no further description of the operation of the crystal microphone is required other than to state that the reflected pressure waves act through the diaphragm 70 to compress the crystal 68 and produce voltage pulses which pass through the leads 62 and 64 to the amplifier and recorder, not shown.

Obviously many other modifications and variations of the invention, as hereinbefore set forth, may be made without departing from the spirit and scope thereof and, therefore, only such limitations should be imposed as are indicated in the appended claims.

We claim:

1. In combination with an apparatus for well sounding, a microphone responsive to pressure waves passing through a fluid medium comprising a housing with a cup-shaped chamber therein for exposure to said fluid medium, a complementary shaped piezo-electric crystal having a pair of opposed, substantially parallel faces, an electrode mounted solidly in said cupshaped chamber on all sides except one but insulated from said housing, said one side of said electrode facing and in direct contact with one face of said crystal, said crystal being mounted solidly with one of said pair of faces in contact with said electrode, the periphery of said crystal being mounted solidly in insulated contact with said housing, the other of said pair of opposed crystal faces being disposed facing said chamber opening so as to be subjected to the pressure waves in said medium, and a thin metallic diaphragm separating the last mentioned face from said fluid medium and being in direct face-to-face contact therewith.

2. In a well sounding apparatus, a microphone responsive to pressure waves in a fluid medium confined in a well comprising a housing having a cup-shaped opening therein adapted to be exposed to said fluid medium, a crystal having piezo-electric properties mounted within said cup-shaped opening so as to be subjected to said pressure waves, an electrode mounted in hard, solid insulating material on all sides except one thereof, said insulating material being in solid contact with said housing, and a thin metallic diaphragm separating said crystal from said fluid medium, said crystal having a pair of opposed, substantially parallel faces, one of said pair of parallel faces being mounted in solid contact against said one side of said electrode and in substantially integral relationship therewith, the other of said pair of parallel faces being in complete face-to-face contact with and covered by said diaphragm and subjected to said pressure waves, and the periphery of said crystal being mounted in solid contact with said insulating material extended.

3. A microphone as described in claim 2 in which said crystal consists of a synthetic ceramic material.

4. A microphone as described in claim 2 in which said crystal is a disc of barium titanate.

5. In a deep well sounding apparatus, a rugged microphone responsive to pressure waves in a fluid medium confined in a well comprising a housing having a cup-shaped opening therein adapted to be exposed to said fluid medium, a relatively thick conducting material electrode mounted in said housing, a hard solid insulating material layer contacting said housing and said electrode adjacent to the housing on all sides of said electrode except one, a crystal having piezo-electric properties and including a pair of opposed substantially parallel faces, said crystal being mounted with one face in contact with said one side of said electrode, a thin metallic diaphragm mounted in contact with the other face of said crystal and exposed to said fluid medium, said diaphragm acting as another electrode for said crystal while protecting the crystal from corrosive effects of said fluid and increasing the sensitivity of the microphone, said crystal having the periphery thereof in solid contact with said insulating material layer extended.

References Cited in the file of this patent

UNITED STATES PATENTS

| | | |
|---|---|---|
| 2,068,744 | Gutzke | Jan. 26, 1937 |
| 2,281,301 | Walker | Apr. 28, 1942 |
| 2,310,559 | Walker | Feb. 9, 1943 |
| 2,430,013 | Hansell | Nov. 4, 1947 |
| 2,468,538 | Benioff | Apr. 29, 1949 |
| 2,496,293 | Kiernan | Feb. 7, 1950 |
| 2,507,770 | Claassen | May 16, 1950 |
| 2,511,624 | D'Halloy | June 13, 1950 |
| 2,539,535 | Espenschied | Jan. 30, 1951 |
| 2,565,159 | Williams | Aug. 21, 1951 |
| 2,587,304 | Fiske | Feb. 26, 1952 |
| 2,607,858 | Mason | Aug. 19, 1952 |
| 2,620,894 | Peterson | Dec. 9, 1952 |
| 2,691,159 | Heibel | Oct. 5, 1954 |

FOREIGN PATENTS

| | | |
|---|---|---|
| 1,046,263 | France | July 8, 1953 |